(12) United States Patent
Choi et al.

(10) Patent No.: US 8,370,131 B2
(45) Date of Patent: Feb. 5, 2013

(54) METHOD AND SYSTEM FOR PROVIDING CONVENIENT DICTIONARY SERVICES

(75) Inventors: Jae Hyuk Choi, Goyang (KR); Je Eon Jeon, Yongin (KR); SooHyun Yoo, Yongin (KR); Sung Won Lee, Seoul (KR); Tae Hoon Lee, Seongnam (KR)

(73) Assignee: NHN Corporation, Seongnam-si (KR)

( * ) Notice: Subject to any disclaimer, the term of this patent is extended or adjusted under 35 U.S.C. 154(b) by 858 days.

(21) Appl. No.: 12/266,587

(22) Filed: Nov. 7, 2008

(65) Prior Publication Data

US 2009/0282037 A1 Nov. 12, 2009

(30) Foreign Application Priority Data

May 8, 2008 (KR) .................. 10-2008-0042705

(51) Int. Cl.
*G06F 17/20* (2006.01)
*G06F 17/28* (2006.01)
*G06F 17/27* (2006.01)
*G06F 17/21* (2006.01)
*G06F 17/30* (2006.01)
*G10L 21/00* (2006.01)

(52) U.S. Cl. ........... 704/10; 704/1; 704/2; 704/4; 704/8; 704/9; 704/270; 704/270.1; 704/275; 707/760; 707/761; 707/765; 707/769

(58) Field of Classification Search .............. 704/4, 8, 704/9, 10, 270, 270.1, 275, 1, 2; 715/200; 707/760, 761, 765, 769
See application file for complete search history.

(56) References Cited

U.S. PATENT DOCUMENTS

| | | | | |
|---|---|---|---|---|
| 5,146,552 A | * | 9/1992 | Cassorla et al. | 715/234 |
| 6,085,201 A | * | 7/2000 | Tso | 715/205 |
| 6,502,064 B1 | * | 12/2002 | Miyahira et al. | 704/7 |
| 6,729,882 B2 | * | 5/2004 | Noble | 434/167 |

(Continued)

FOREIGN PATENT DOCUMENTS

| | | |
|---|---|---|
| CN | 1746885 | 3/2006 |
| JP | 09-044498 | 2/1997 |

(Continued)

OTHER PUBLICATIONS

Takahashi et al., "Development of an Effective Multilingual Display Engine for Language Learners," Graduate School of Decision Science and Technology, Department of Human System Science, Tokyo Institute of Technology, Apr. 3, 2008.*

(Continued)

*Primary Examiner* — Edgar Guerra-Erazo
(74) *Attorney, Agent, or Firm* — H.C. Park & Associates, PLC (57) ABSTRACT

A method for providing a dictionary service to a terminal, includes: providing a dictionary service window in or near a web browser for displaying a webpage through a screen of the terminal if a certain item for executing dictionary services in the terminal is clicked; (b) receiving a query inputted in the provided dictionary service window wherein the query includes a query for requesting meaning, a query for requesting pronunciation, or both; and (c) searching and providing a translation data corresponding to the query for requesting meaning or a pronunciation data corresponding to the query for requesting pronunciation. The method provides a translation data and/or pronunciation data of a word or expression which the user wants to find out while web surfing through the dictionary service window.

15 Claims, 12 Drawing Sheets

U.S. PATENT DOCUMENTS

| | | | |
|---|---|---|---|
| 7,058,626 B1* | 6/2006 | Pan et al. | 1/1 |
| 7,228,268 B2* | 6/2007 | Xun | 704/4 |
| 7,228,269 B2* | 6/2007 | Xun | 704/4 |
| 7,254,527 B2* | 8/2007 | Xun | 704/4 |
| 7,315,809 B2* | 1/2008 | Xun | 704/4 |
| 7,392,466 B2* | 6/2008 | Pan et al. | 715/200 |
| 7,590,626 B2* | 9/2009 | Li et al. | 707/708 |
| 7,752,032 B2* | 7/2010 | Izuha | 704/7 |
| 2004/0102956 A1 | 5/2004 | Levin | |
| 2006/0190240 A1* | 8/2006 | Shin et al. | 704/1 |
| 2007/0010992 A1* | 1/2007 | Hon et al. | 704/9 |
| 2007/0027671 A1* | 2/2007 | Kanawa | 704/4 |
| 2007/0112554 A1* | 5/2007 | Goradia | 704/4 |
| 2008/0052064 A1* | 2/2008 | Kim | 704/10 |
| 2009/0193003 A1* | 7/2009 | Heymans et al. | 707/3 |
| 2009/0222428 A1* | 9/2009 | Bode | 707/4 |

FOREIGN PATENT DOCUMENTS

| | | |
|---|---|---|
| JP | 09-081580 | 3/1997 |
| JP | 2004-295537 | 10/2004 |
| JP | 2007-065990 | 3/2007 |
| KR | 1020030037077 | 5/2003 |
| KR | 1020080007887 | 1/2008 |
| TW | 550480 | 9/2003 |
| TW | I247272 | 1/2006 |
| TW | 200632680 | 9/2006 |
| TW | 200805090 | 1/2008 |
| TW | 200813755 | 3/2008 |
| WO | 2007/139290 | 12/2007 |

OTHER PUBLICATIONS

Mac People, Japan, ASCII Corporation, Aug. 1, 2007, vol. 13-8, p. 139.

Ryoko Suzuki, Review English-Japanese 98!, Japan, Softbank Corporation, Jun. 1, 1998, vol. 17-1, pp. 110-111.

Taiwanese Preliminary Notice to First Office Action issued for related Taiwanese Patent Application No. 097138363 issued on Jan. 11, 2012.

* cited by examiner

METHOD AND SYSTEM FOR PROVIDING CONVENIENT DICTIONARY SERVICES

CROSS-REFERENCE TO RELATED APPLICATION

This application claims under 35 U.S.C. §119(a) the benefit of Korean Patent Application No. 10-2008-0042705 filed May 8, 2008, the entire contents of which are incorporated herein by reference.

TECHNICAL FIELD

The present invention relates to a method and a system for providing dictionary services. More particularly, it relates to a method and a system for providing dictionary services that enables users to use online dictionary while the user is reading a webpage.

BACKGROUND ART

Now, many portals provide dictionary services from which a user is able to get the information on translation or pronunciation of a word or expression the user wants to know. According to the dictionary services, when the user inputs in a query window a word or expression the user wants to search, the user can get the result including a variety of meanings, pronunciation, idioms and usage examples of the word or expression.

The conventional dictionary services, however, are not always convenient. For example, while the user is reading a webpage with foreign words, if there is a word or expression the user does not know, the user must open another web browser providing dictionary services to find out its meaning or pronunciation.

SUMMARY

In accordance with one aspect of the present invention, there is provided a method for providing a dictionary service to a terminal, including the steps of: (a) providing a dictionary service window in or near a web browser for displaying a webpage through a screen of the terminal if a certain item for executing dictionary services in the terminal is clicked; (b) receiving a query inputted in the provided dictionary service window wherein the query includes a query for requesting meaning, a query for requesting pronunciation, or both; and (c) searching and providing a translation data corresponding to the query for requesting meaning or a pronunciation data corresponding to the query for requesting pronunciation.

In accordance with another aspect of the present invention, there is provided a system for providing a dictionary service to a terminal, including: a meaning information database in which a translation data of at least one word or expression is recorded; a pronunciation information database in which the pronunciation data of the word or words or expression or expressions is recorded; a dictionary service window providing part which provides a dictionary service window in or near a browser for displaying a webpage through a screen of the terminal and receives a query inputted by a user of the terminal through the dictionary service window; and a meaning and pronunciation information providing part which retrieves and provides the translation data or the pronunciation data recorded in the meaning information database or the pronunciation information database in response to a query for requesting meaning or pronunciation if the query including the query for requesting meaning or pronunciation is received through the dictionary service window.

A still another aspect of the present invention provides a computer-readable medium to implement the above-described method.

The above and other features will be discussed infra.

BRIEF DESCRIPTION OF THE DRAWINGS

The above objects and features of the present invention will become more apparent from the following description of the preferred embodiments given in conjunction with the accompanying drawings, in which.

Reference numerals set forth in the Drawings includes reference to the following elements as further discussed below:

100: A dictionary service system
110: A dictionary service window-providing part
120: A meaning and pronunciation information-providing part
130: A meaning information database
140: A pronunciation information database
150: A communication part
160: A control part
200: A terminal

DETAILED DESCRIPTION

In the following detailed description, reference is made to the accompanying drawings that show, by way of illustration, specific embodiments in which the present invention may be practiced. These embodiments are described in sufficient detail to enable those skilled in the art to practice the present invention. It is to be understood that the various embodiments of the present invention, although different from one another, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The embodiments of the present invention will be described, in detail, with reference to the accompanying drawings.

Figure 1:
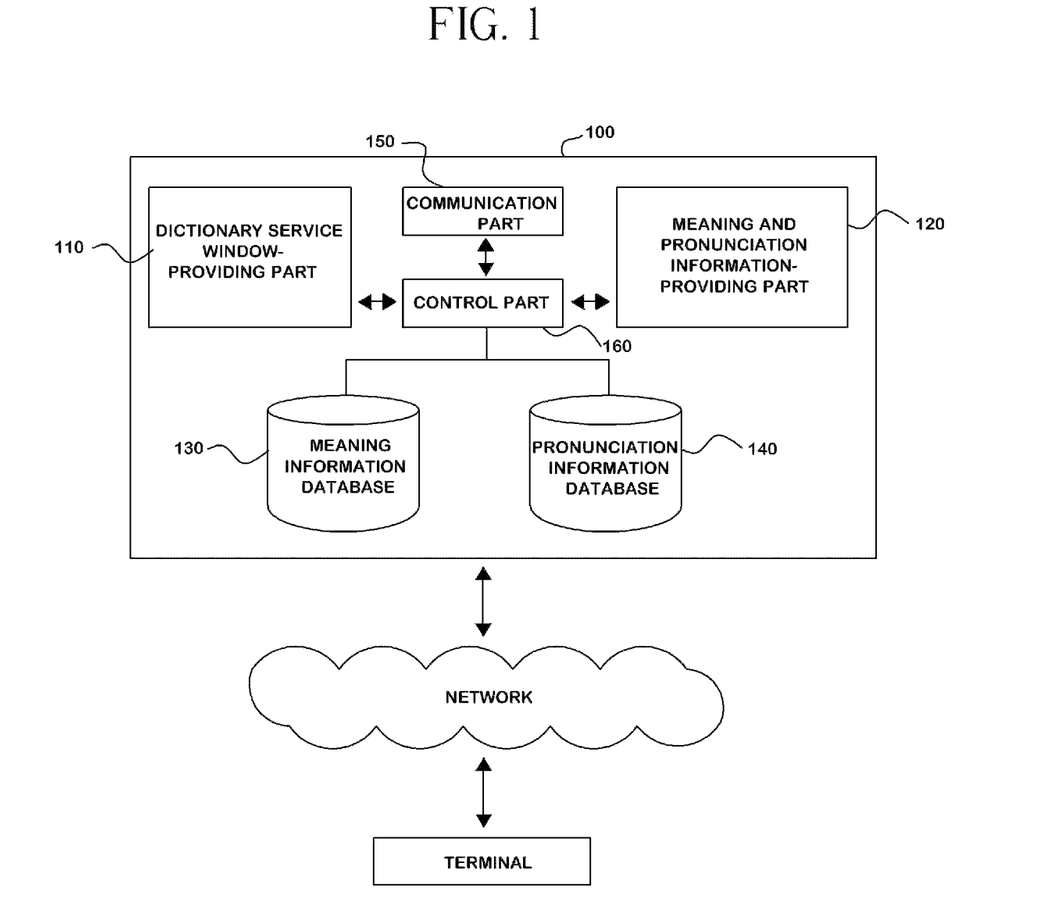
FIG. 1 is a diagram which exemplarily shows the configuration of a system for providing dictionary services in accordance with an example embodiment of the present invention.

FIG. 1 is a diagram which exemplarily shows the configuration of a system for providing dictionary services (dictionary service system) in accordance with an example embodiment of the present invention.

With reference to FIG. 1, the dictionary service system 100 provides dictionary services on a terminal 200 through a network. Preferably, it may include a dictionary service window-providing part 110, a meaning and pronunciation information-providing part 120, a meaning information database 130, a pronunciation information database 140, a communication part 150, and a control part 160.

The dictionary service window-providing part 110 may perform a function to provide a dictionary service window in a browser for displaying a webpage through a screen of the terminal 200. With the use of a bookmarklet technology, when clicking a certain item included in a bookmark in the browser, the user of the terminal 200 may be provided with the dictionary service window in the browser. It is noted that the term "bookmark" or a similar word used herein includes a bookmarks function provided from a variety of services and a favorites function provided from the browser.

The dictionary service window-providing part 110 may provide the dictionary service window in the browser in many ways. For example, the dictionary service window can be provided in a space where the content of the webpage does not exist in the browser. Also, the window can be provided so as to overlay the content of the webpage displayed in the browser.

Owing to the dictionary service window-providing part 110, the user may get the dictionary service window in the web browser without having to open a separate browser.

In addition, the dictionary service window-providing part 110 may suitably perform a function to receive a query inputted by the user of the terminal 200 through the dictionary service window. The query may be in various forms. For instance, it may include a query for requesting meaning of a word or expression and/or a query for requesting pronunciation thereof. The query for requesting meaning is used to receive a translated meaning of a certain word or expression which the user wants to look up from the dictionary service system 100, and the query for requesting pronunciation is used to receive information on the pronunciation (the information on the pronunciation of a native speaker) of the word or expression.

The dictionary service window provided in the browser of the terminal 200 by the dictionary service window-providing part 110 may, preferably, include a translation service tab and/or a pronunciation service tab, and the detailed examples of UIs will be explained with reference to FIG. 4 below. If the user selects the translation service tab, a query window for inputting a word or expression the user wants to look up therein is provided to transmit a query for requesting meaning, and if the user selects a pronunciation service tab, a query window for inputting a word or expression the user wants to look up therein is provided to transmit a query for requesting pronunciation.

The user may input a query, i.e., a certain word or expression, for example, not only directly in the query window for the translation service or the pronunciation service but also by drag-and-dropping into the query window a word or expression which is included in the webpage in the browser.

In a modified embodiment, if a query inputted through the query window for the translation service exceeds a predetermined number of bytes (e.g., 20 bytes), the query may be automatically regarded as one inputted through the query window for the pronunciation service. The predetermined number of bytes can be set in various ways according to the use behavior of the user.

Preferably, both the translation service tab and the pronunciation service tab may be included in a dictionary service window. Also preferably, only one of the tabs may be included in a dictionary service window.

The meaning information database 130 records at least one word or expression in a first language and translation word(s) or expression(s) in at least one second language corresponding to the word(s) or expression(s) in the first language.

The pronunciation information database 140 records the data of native pronunciation of the word(s) or expression(s).

The meaning information database 130 and the pronunciation information database 140 may be realized in various ways. For instance, it may include not only a narrow meaning of database but also a wide meaning of database such as data record based on file systems. Accordingly, even a set of simple logs can be used as the databases as long as the data can be retrieved and extracted for performing the above-described function.

In accordance with one example embodiment of the present invention, if the query for requesting meaning is received, the meaning and pronunciation information-providing part 120 retrieves a translation data from the meaning information database 130 and then provide it to the terminal 200. On the other hand, if the query for requesting pronunciation is received, the meaning and pronunciation information-providing part 120 retrieves a pronunciation data from the pronunciation information database 140 and then provide it to the terminal 200.

The translation data may, suitably, include information in a form of text translated in a variety of languages, e.g., between English and Korean, between Korean and Chinese, between Korean and Japanese and between English and Chinese. In addition, the translation data may, suitably, include synonym, pronunciation symbols etc. of the word or expression.

If information matched with the query for requesting meaning or pronunciation does not exist, the meaning and pronunciation information-providing part 120 may recommend a word(s) or expression(s) similar to the query and provide it to the terminal 200. The recommended word or expression may be recorded in a separate database (not illustrated) or in the meaning information database 130 or the pronunciation information database 140.

In other words, if a user, while web surfing, directly inputs a word or expression as a query in the query window provided at the translation and/or pronunciation service tab or if the user drag-and-drops into the query window the word or expression included in the webpage, the meaning and pronunciation information-providing part 120 may receive the query from the dictionary service window-providing part 110 and then retrieve the translation data and/or pronunciation data from the databases 130 and 140 to thereby provide to the terminal 200.

The communication part 150 performs a function to allow the dictionary service system 100 to receive or transmit a variety of data from or to the terminal 200.

The control part 160 may control data flow among the dictionary service window-providing part 110, the meaning and pronunciation information-providing part 120, the meaning information database 130, the pronunciation information database 140, and the communication part 150. That is, the control part 160 may control the respective functions of the dictionary service window-providing part 110, the meaning and pronunciation information-providing part 120, the meaning information database 130, and the pronunciation information database 140 by controlling signals received or transmitted among the modules through the communication part 150.

Figure 2:
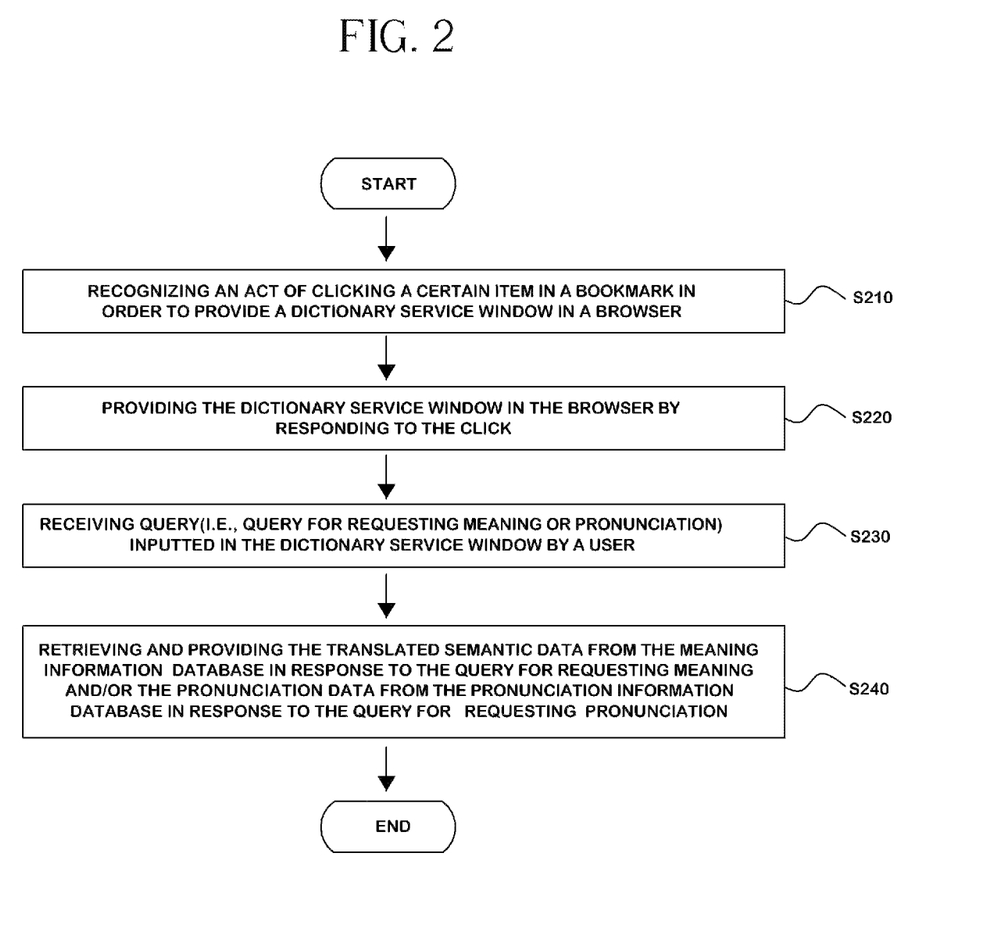
FIG. 2 is a flowchart showing a method for providing dictionary services in accordance with an example embodiment of the present invention.

FIG. 2 is a flowchart showing a method for providing dictionary services in accordance with an example embodiment of the present invention.

Referring to FIG. 2, the method for providing dictionary services may include the steps of: recognizing an act of clicking a certain item in a bookmark installed by the bookmarklet technology in order to provide a dictionary service window in a browser S210; providing the dictionary service window in the browser by responding to the click S220; receiving a query (e.g., a query for requesting meaning, a query for requesting pronunciation or both) inputted in the dictionary service window by the user S230; and retrieving and providing a translation data from a meaning information database in response to the query for requesting meaning and/or a pronunciation data from a pronunciation information database in response to the query for requesting pronunciation S240.

FIGS. 3A to 3D are exemplary diagrams referring to the procedure in which the dictionary service window is displayed on the terminal 200 in accordance with an example embodiment of the present invention.

Figure 3A:
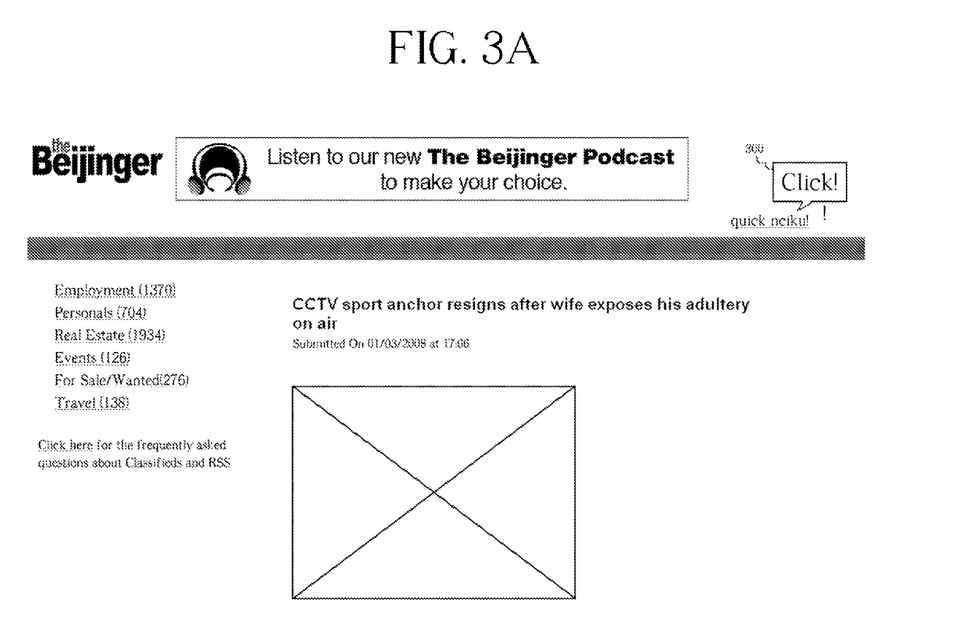
FIGS. 3A to 3D are exemplary diagrams referring to the procedure in which a dictionary service window is displayed on the browser of a terminal in accordance with an example embodiment of the present invention.
Figure 3B:
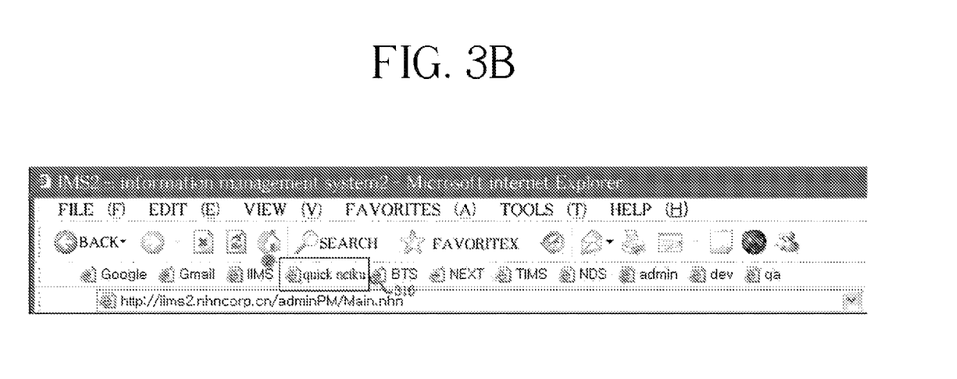

As shown in FIG. 3A, if a user clicks a link 300 for the dictionary service indicated as, for example, "quick nciku" provided on a webpage, the item 'quick nciku' 310 may be registered in the bookmark menu of the browser as seen in FIG. 3B.

Figure 3C:
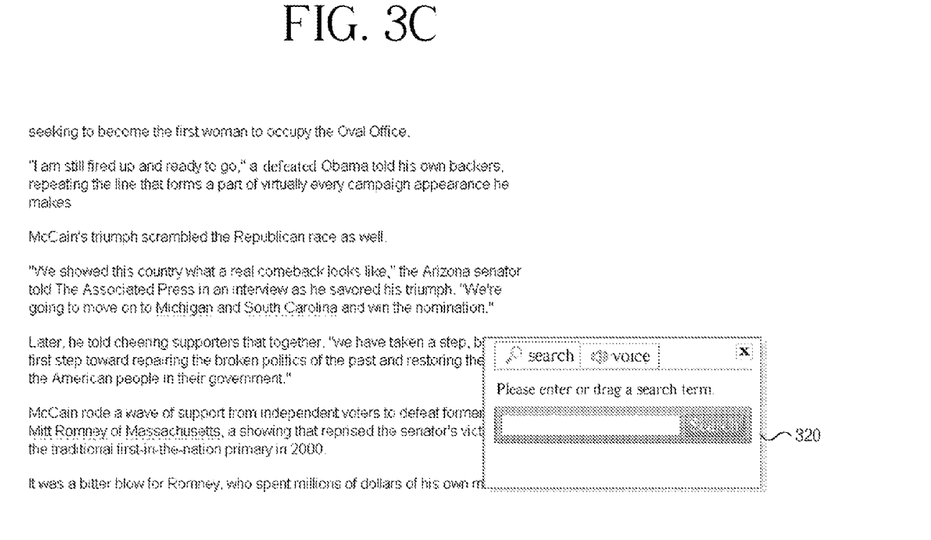

If the user clicks the menu "quick nciku" 310 included in the bookmark menu, the dictionary service window-providing part 110 may display a dictionary service window 320 in the browser as shown in FIG. 3C. At the time, the dictionary service window 320 may be displayed in a space where texts, images etc. of the contents of the webpage do not exist or by overlaying the webpage content. For example, as shown in FIG. 3C, the dictionary service window 320 may be displayed in the space located at the lower right part of the browser in which there is no text, image etc. More detailed information on the dictionary service window 320 will be described by reference of FIGS. 4A to 6D later.

Figure 3D:
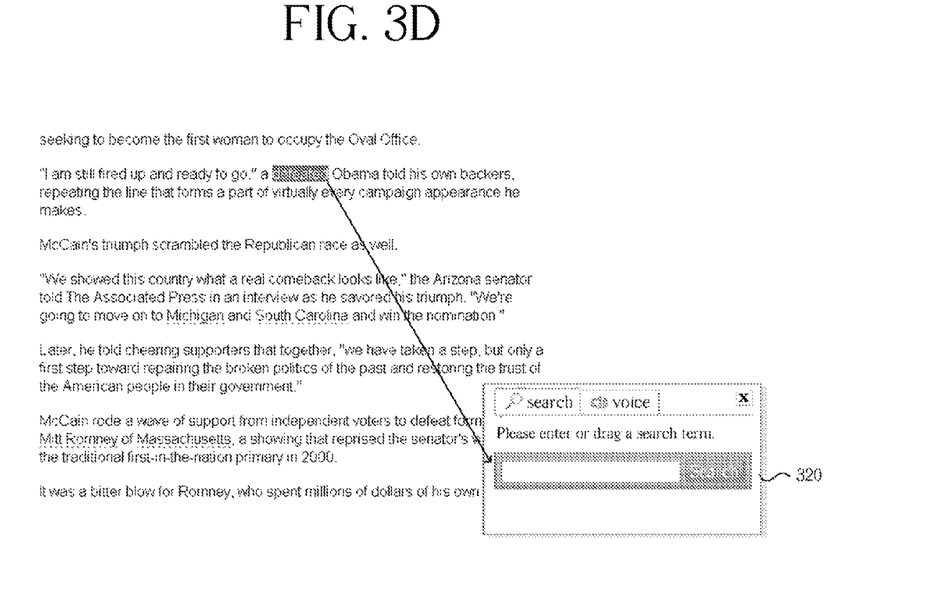

FIG. 3D shows the procedure to input a query by drag-and-dropping into the dictionary service window 320 a word or expression found in a certain website.

Figure 4A:
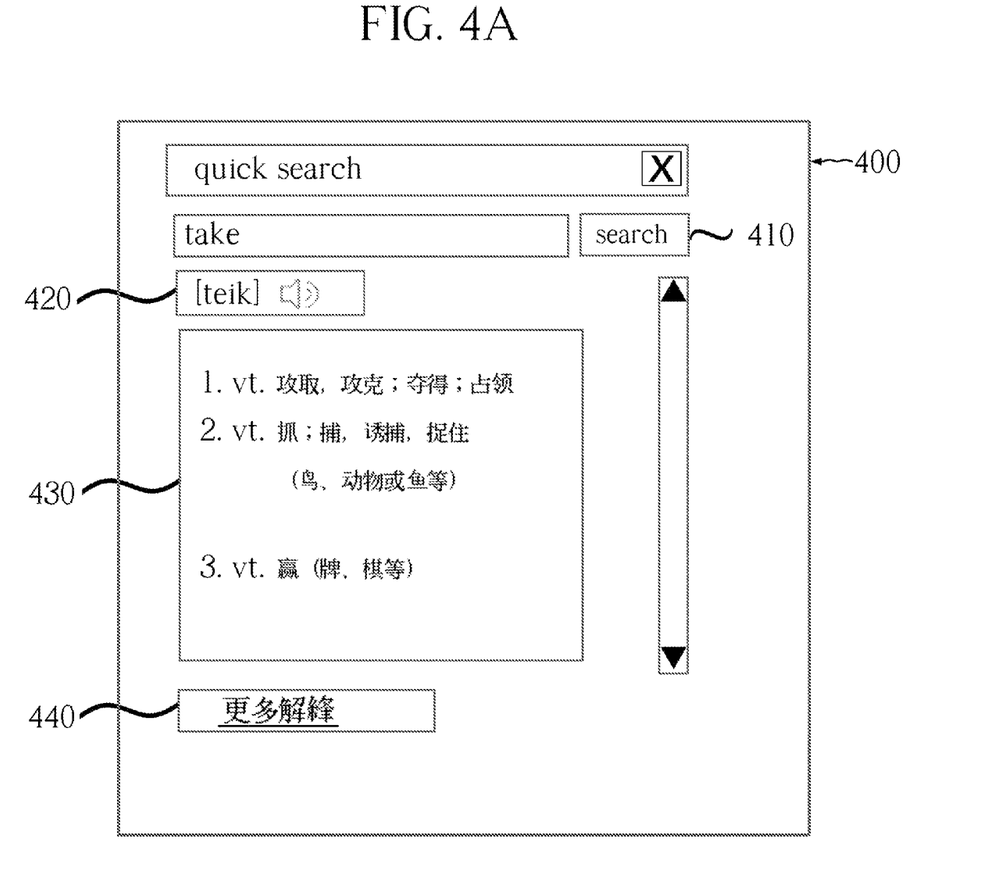
FIGS. 4A to 4B are diagrams which exemplarily show the state in which the dictionary service window is provided to perform a translation function on the terminal in accordance with an example embodiment of the present invention.
Figure 4B:
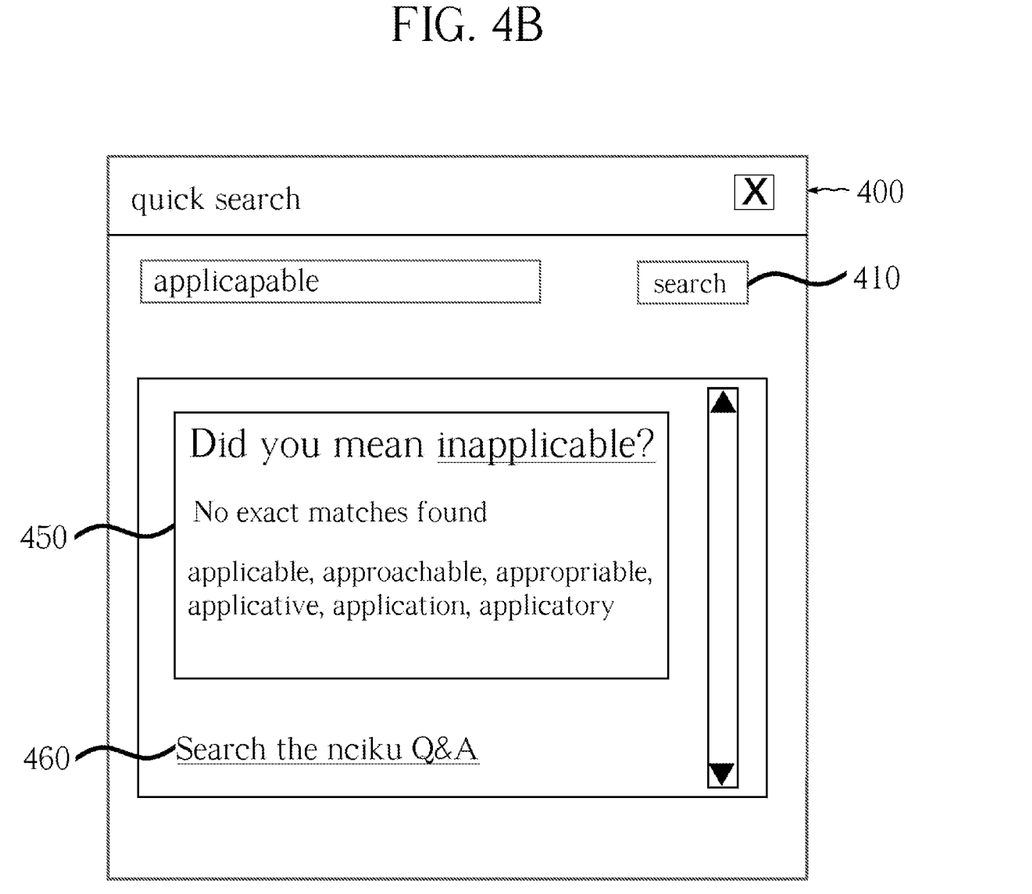

FIGS. 4A to 4B are diagrams which exemplarily show the state in which the dictionary service window is provided to perform a translation function (shortly quick search) on the terminal 200 in accordance with an example embodiment of the present invention.

As illustrated in FIG. 4A, the dictionary service window displayed on the terminal 200 includes a translation service window 400 for providing a Chinese meaning of an inputted English query. (Even though FIG. 4A presents an English query, it is, of course, possible to provide a translated meaning of an inputted Chinese query etc. in English etc.) The translation service window 400 includes a query window 410, a button for hearing a pronunciation 420, an area for displaying a meaning 430 and an additional information area 440.

The query window 410 functions as an area to directly input a particular word or expression the user wants to search or a destination to drag-and-drop a particular word or expression displayed on the webpage.

The button for hearing a pronunciation 420 performs a function to request a pronunciation of the query inputted in the query window 410.

The area for displaying a meaning 430 means an area to receive and display the translation data searched from the meaning information database 130 in the dictionary service system 100. If the user inputs an English word 'take' in the query window 410, a translated meaning of the word 'take' may be provided to the area 430. For example, the translated meaning may be displayed with three lines in the area 430 but this is not limited thereto. In addition, if it is difficult to display a certain meaning of the word with one line, the meaning may be displayed up to two lines but the situation is not limited thereto.

The additional information area 430 may include a link for opening the search result page of the dictionary service "nciku" by popping up a separate window.

With reference to FIG. 4B, the translation service window 400 displayed on the terminal 200 may include a recommendation area 450.

If there does not exist a search result corresponding to a word or expression requested by the user in the meaning information database 130 of the dictionary service system 100, a recommended word or expression similar to the word or expression is displayed in the recommendation area 450.

Figure 5A:
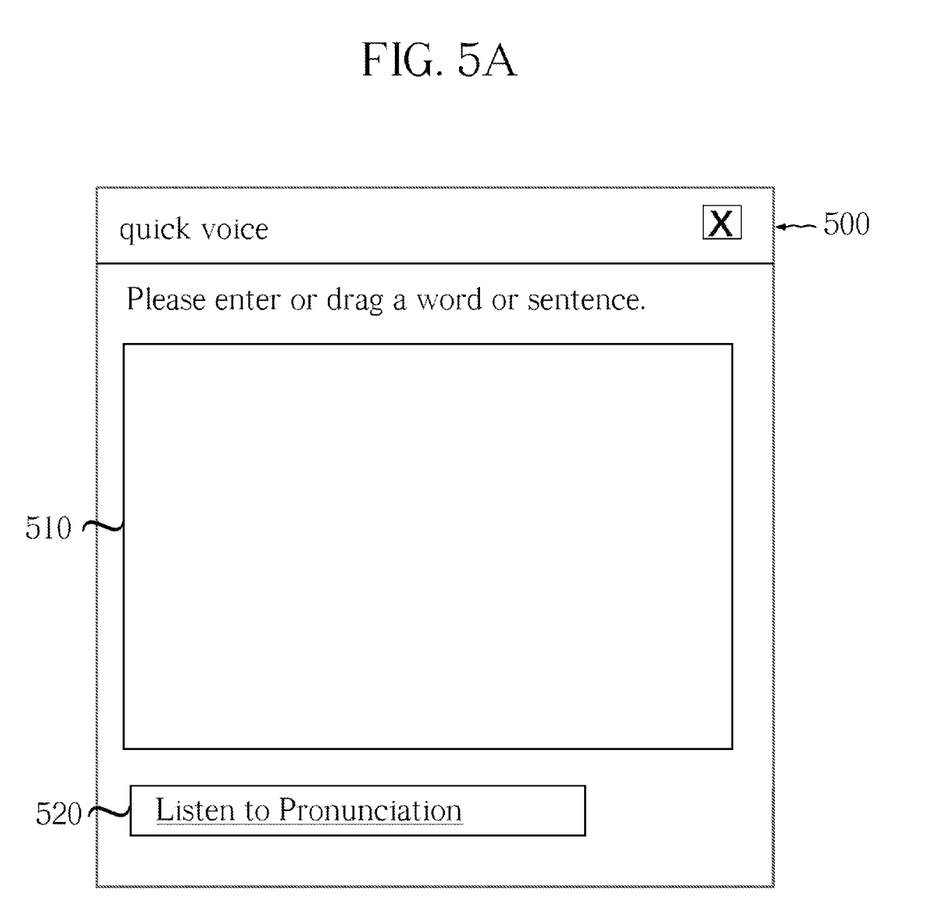
FIGS. 5A and 5B are drawings that exemplarily represent the state in which the dictionary service window is provided to perform a TTS function on the terminal in accordance with an example embodiment of the present invention.
Figure 5B:
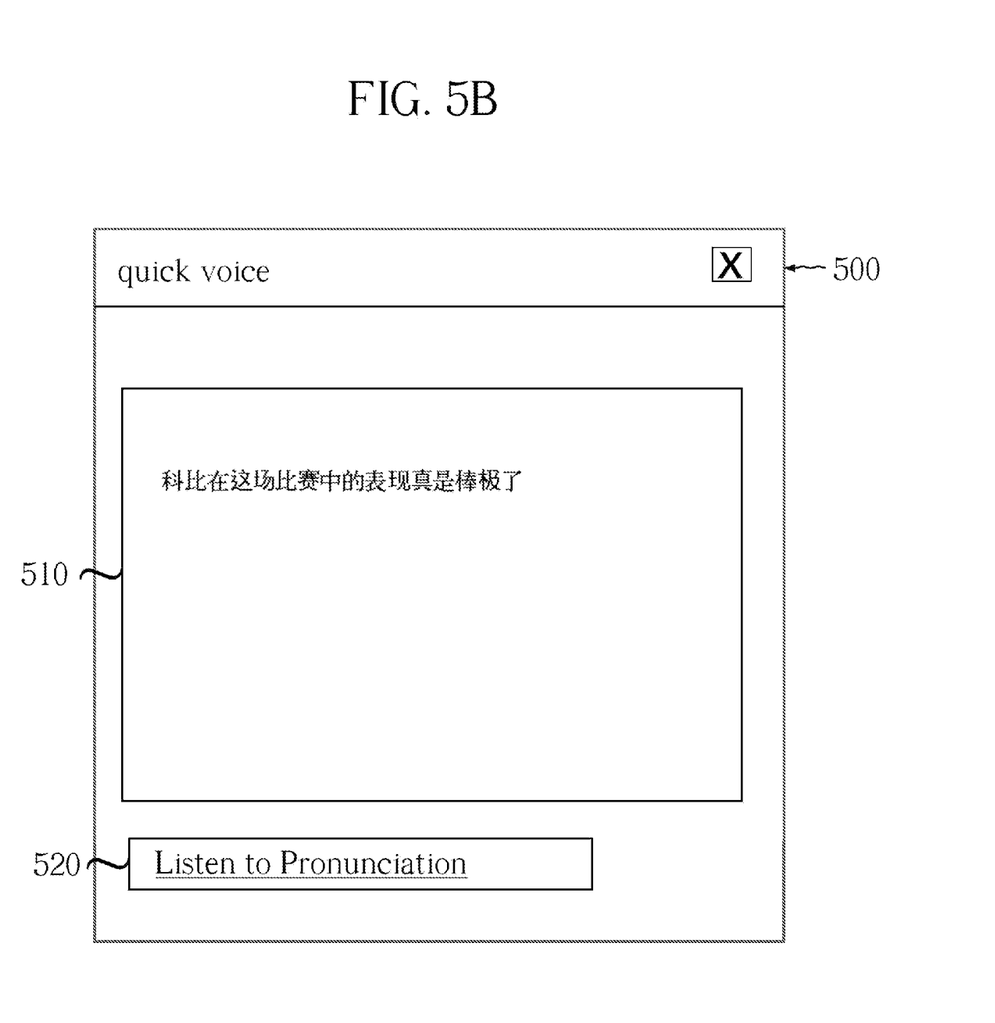

FIGS. 5A and 5B exemplarily represent a dictionary service window 500 for providing pronunciation (shortly quick voice) of the word or expression displayed on the terminal 200 in accordance with an example embodiment of the present invention.

Referring to FIGS. 5A to 5B, the dictionary service window 500 includes a word/expression inputting area 510, a button for hearing a pronunciation 520 etc.

The word/expression inputting area 510 functions as a window to allow the user to directly input a word or expression of which the user wants to hear a pronunciation of the word or expression or drag-and-drop a certain word or expression displayed on a webpage.

If the button for hearing a pronunciation 520 is clicked, a text-to-speech (TTS) function is executed. In other words, if the button is clicked, pronunciation information regarding the word or expression inputted in the word/expression inputting area 510 may be provided.

For example, as illustrated in FIG. 5B, if the user inputs a certain expression in Chinese in the word/expression inputting area 510 and then clicks the button 520, the pronunciation of the certain expression in native Chinese may be provided.

FIGS. 6A to 6D exemplarily refer to the configuration of the dictionary service window displayed on the terminal 200 in accordance with an example embodiment of the present invention.

As illustrated in FIGS. 6A to 6D, a dictionary service window 600 in accordance with the present invention may include a pronunciation service tab 610 and a translation service tab 620.

Figure 6A:
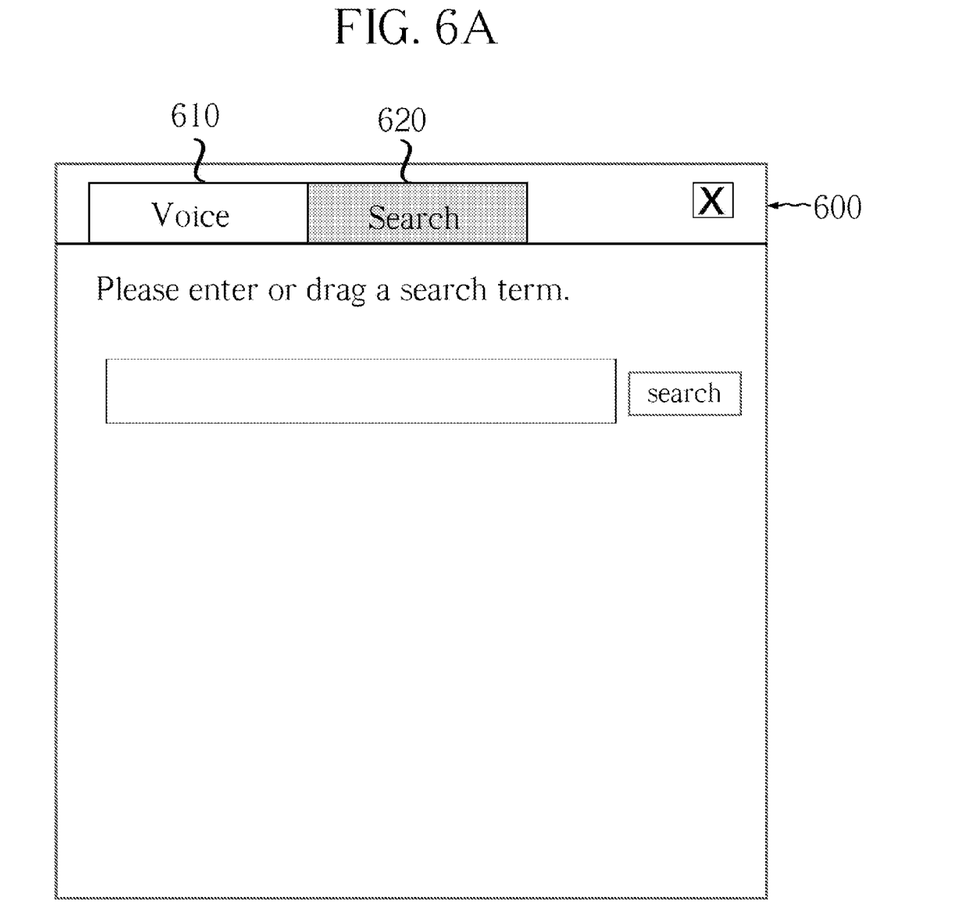
FIGS. 6A to 6D are diagrams which exemplarily refer to the state in which the dictionary service window is provided to perform both translation and TTS functions on the terminal in accordance with an example embodiment of the present invention.
Figure 6B:
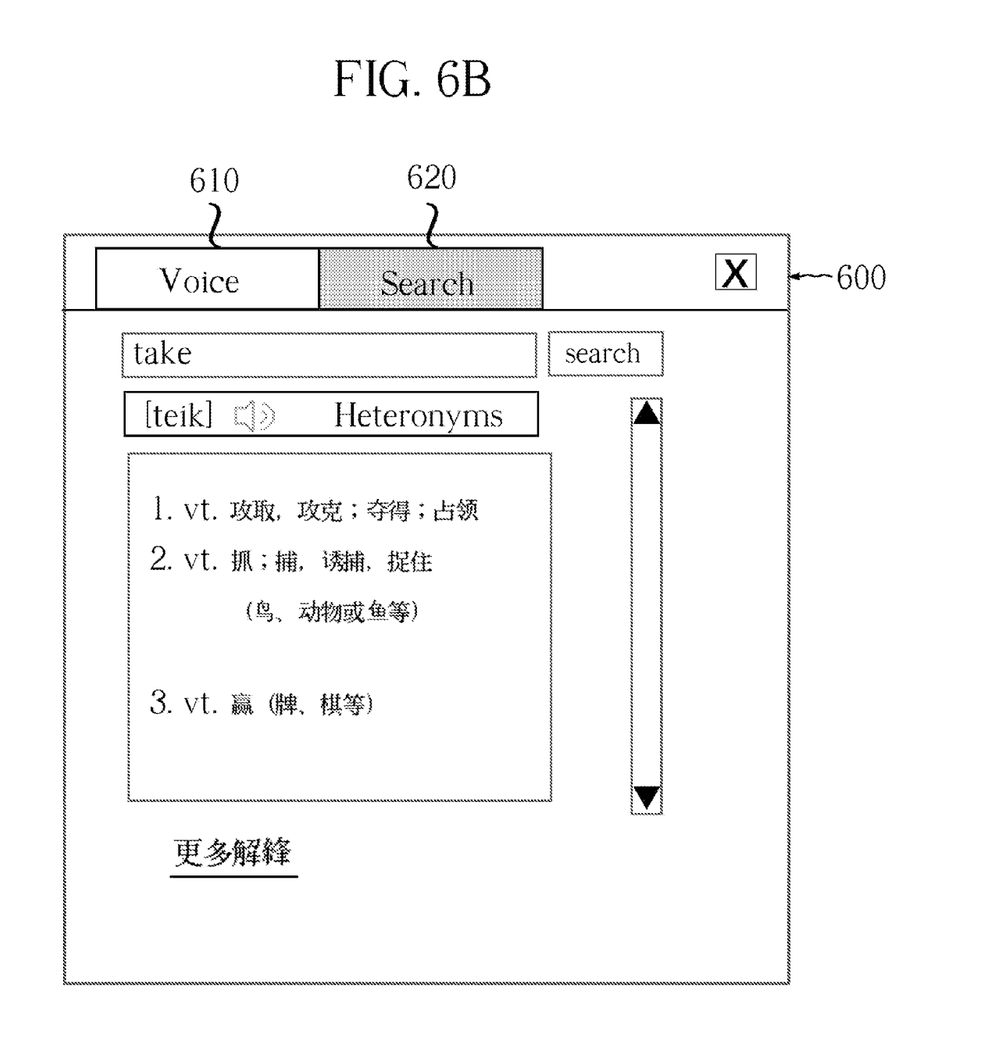
Figure 6C:
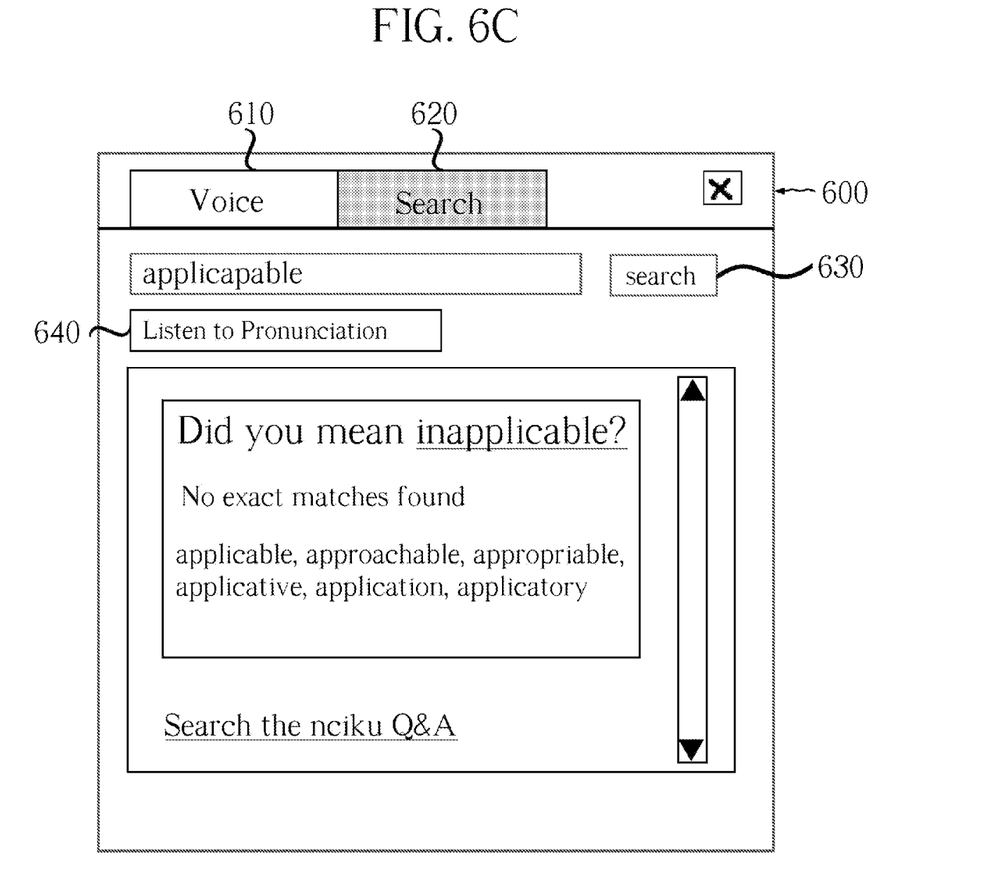

FIGS. 6A to 6C illustrate the function of the translation service tab 620 included in the dictionary service window 600. Detailed explanation is omitted because the function of the translation service tab 620 is the same as or similar to that explained with regard to FIGS. 4A to 4B.

Figure 6D:
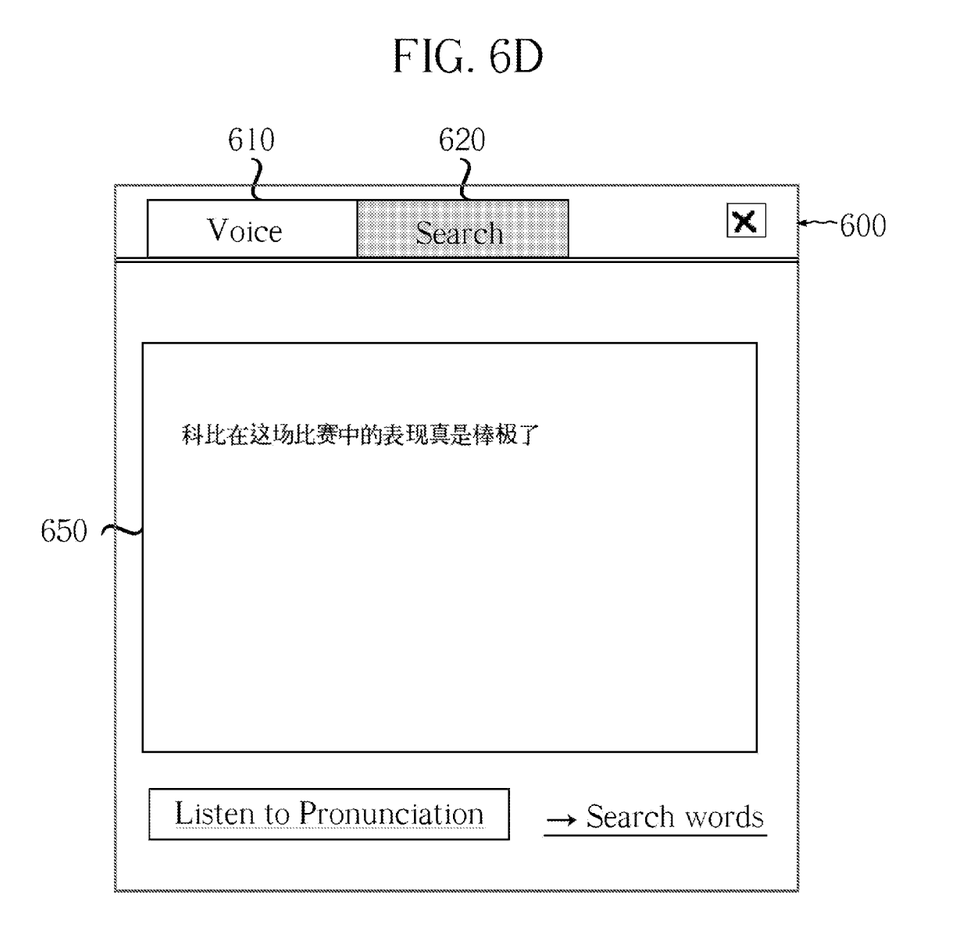

In addition, FIG. 6D illustrates the function of the pronunciation service tab 610. For the reason that the function of the pronunciation service tab 610 is similar to or the same as that explained with regard to FIGS. 5A to 5B, detailed explanation is omitted.

As described above, the present methods and systems enables a user to use dictionary services while web surfing without having to opening a separate browser providing dictionary services. Furthermore, the present methods and systems provide user friendly UI.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method, using a processor, for providing dictionary services to a terminal, the method comprising:
    displaying a dictionary service window associated with a web browser on a screen of the terminal in response to detection of a click for executing dictionary services;
    receiving an input query and determining, by the processor, whether the input query exceeds a number of bytes, and if the input query exceeds the number of bytes, the input inquiry is an input query for requesting pronunciation; and
    selectively providing, by the processor, either a translation data corresponding to an input query for requesting meaning or a pronunciation data corresponding to the input query for requesting pronunciation according to the determination.

2. The method of claim 1, further comprising:
    providing a translation service tab to receive a query window in which the input query for requesting meaning is inputted, and;
    providing a pronunciation service tab to receive a query window in which the input query for requesting pronunciation is inputted in the dictionary service window.

3. The method of claim 1, wherein the receiving the input query comprises receiving a certain word or expression directly inputted as a query through a query window provided in the translation service tab and the pronunciation service tab, and wherein the receiving the input query further comprises receiving a certain word or expression included in a webpage as a query by drag-and-dropping the certain word or expression into the query window provided in the translation service tab and the pronunciation service tab.

4. The method of claim 1, wherein the number of bytes is 20.

5. The method of claim 1, further comprising:
    providing a word or an expression similar to the input query for requesting meaning or pronunciation if the processor fails to retrieve the translation data corresponding to the input query for requesting meaning or pronunciation.

6. The method of claim 1, further comprising:
    providing the dictionary service window in the web browser, in a space where a content of the webpage does not exist in the browser.

7. The method of claim 1, further comprising:
    providing the dictionary service window so as to overlay a content of the webpage displayed in the browser.

8. A non-transitory computer-readable medium having stored thereon a computer program that, when executed by one or more processors, causes the one or more processors to perform acts including:
    displaying a dictionary service window associated with a web browser on a screen of the terminal in response to detection of a click for executing dictionary services;
    receiving an input query;
    determining if the input query exceeds a number of bytes, and if the input query exceeds the number of bytes, the input query is an input query for requesting pronunciation; and
    selectively providing a translation data corresponding to an input query for requesting meaning or a pronunciation data corresponding to the input query for requesting pronunciation according to the determination.

9. A system for providing a dictionary service to a terminal, comprising:
    a meaning information database in which a translation data of at least one word or expression is recorded;
    a pronunciation information database in which the pronunciation data of the word or words or expression or expressions is recorded;
    a processor and a non-transitory computer readable medium having stored thereon instructions which, when executed by the processor, cause the processor to execute the instructions comprising:
    a dictionary service window instruction configured to provide a dictionary service window associated with a browser for displaying a webpage through a screen of the terminal and to receive an input query through the dictionary service window; and
    a meaning and pronunciation information instruction configured to retrieve and provide the translation data or the pronunciation data recorded in the meaning information database or the pronunciation information database in response to an input query for requesting meaning or pronunciation, and to provide whether the translation data or the pronunciation data is determined based on the input query exceeding a number of bytes, the input query is the input query for requesting pronunciation, if the input query exceeds the number of bytes,
    wherein the dictionary service window instruction is configured to provide the dictionary service window associated with the browser in response to a click of a certain item.

10. The system of claim 9, wherein the dictionary service window instruction is configured to provide a translation service tab to receive a query window in which the input query for requesting meaning is inputted, and a pronunciation service tab is configured to receive a query window in which the input query for requesting pronunciation is inputted.

11. The system of claim 10, wherein the meaning and pronunciation information instruction is configured to search and to receive the translation data or the pronunciation data on a certain word or expression if the certain word or expression is directly input as a query through the query window in the translation service tab or the pronunciation service tab or if the user drag-and-drops a certain word or expression which is included in the webpage into the query window in the translation service tab or the pronunciation service tab.

12. The system of claim 9, wherein the number of bytes is 20.

13. The system of claim 9, wherein, if the meaning and pronunciation information instruction fails to find the information corresponding to the input query for requesting meaning or pronunciation, the meaning and pronunciation information instruction is configured to provide a word or expression similar to the input query for requesting meaning or pronunciation.

14. The system of claim 9, wherein the dictionary service window instruction is configured to provide the dictionary service window in a space where a content of the webpage does not exist in the browser.

15. The system of claim 9, wherein the dictionary service window overlays a content of the webpage displayed in the browser by the dictionary service window instruction.

* * * * *